(No Model.) 2 Sheets—Sheet 1.
G. W. SHAILER & J. S. WATCHORN.
CULTIVATOR.
No. 555,623. Patented Mar. 3, 1896.
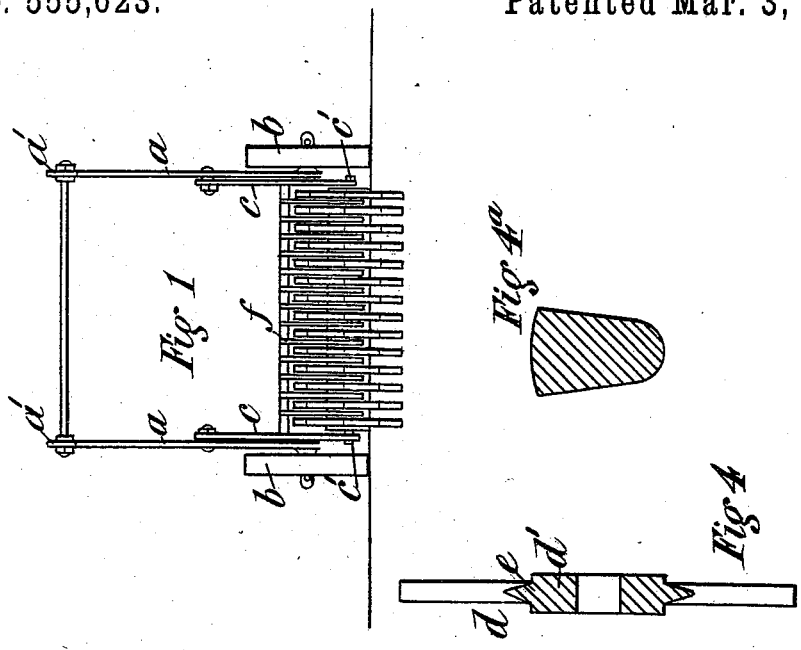
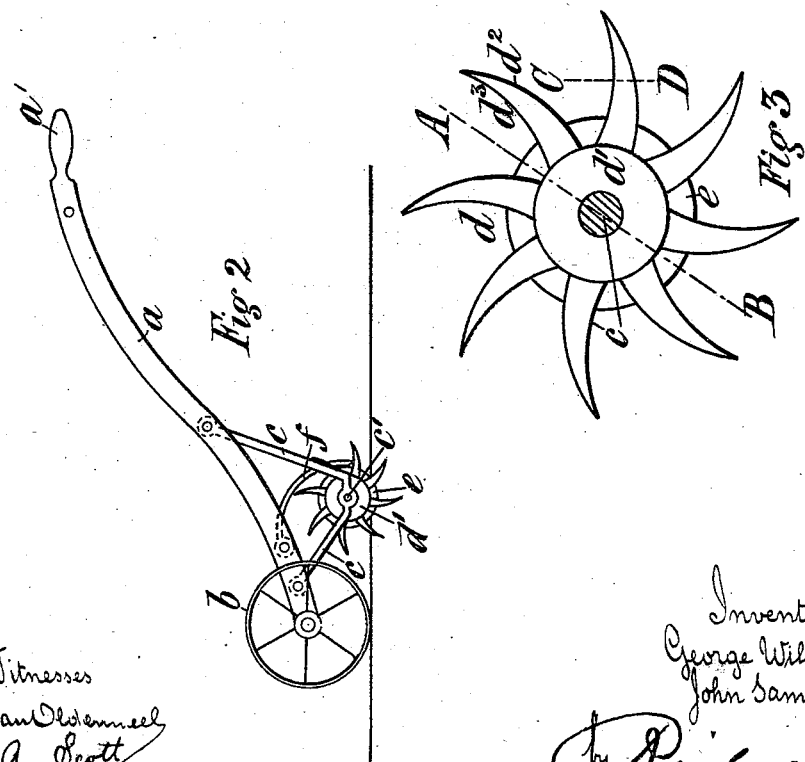
Witnesses
H. van Oldenneel
E. A. Scott
Inventors
George William Shailer
John Samuel Watchorn
by Richards
Attorneys

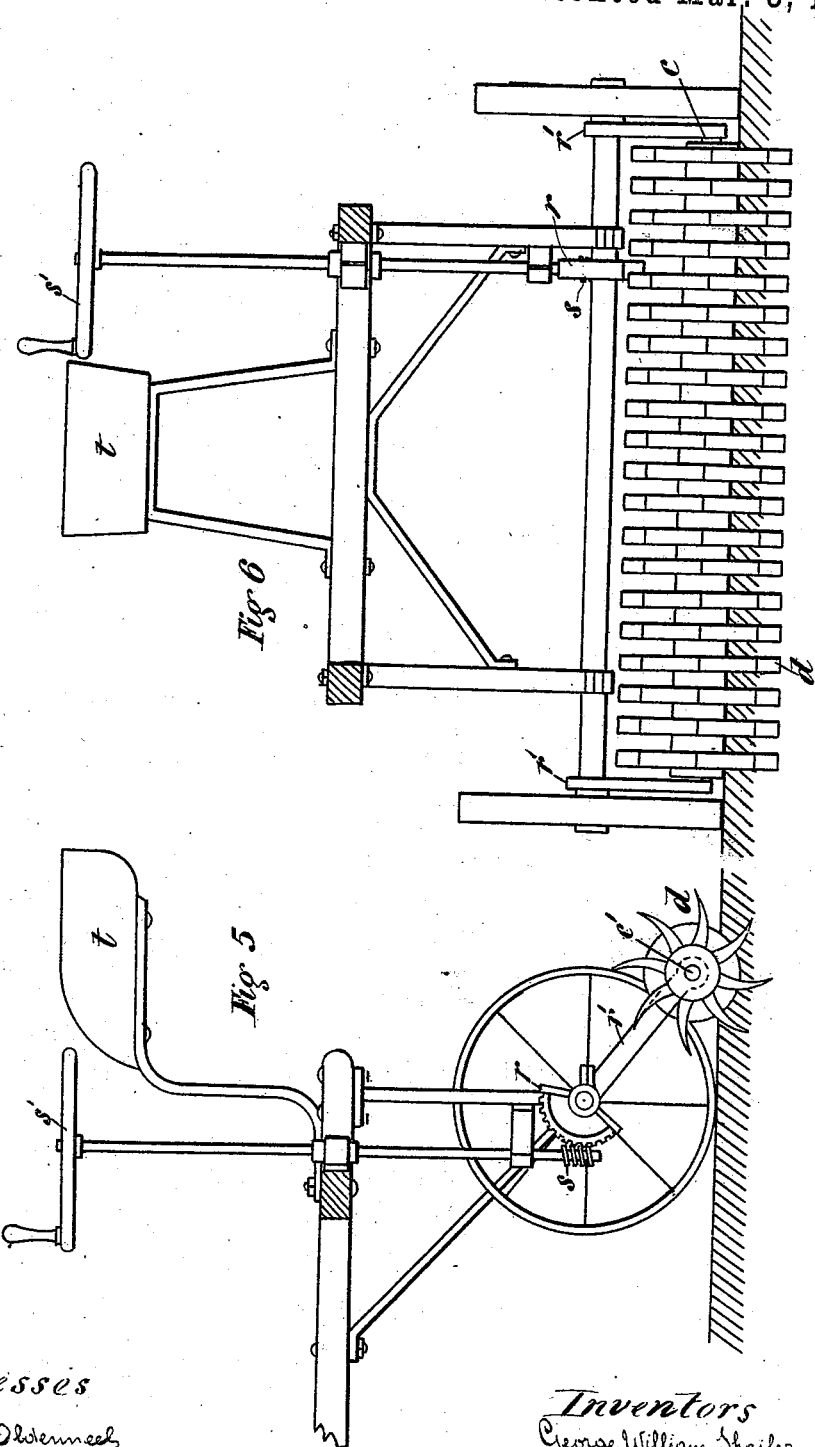

UNITED STATES PATENT OFFICE.

GEORGE W. SHAILER AND JOHN SAMUEL WATCHORN, OF PALMERSTON NORTH, NEW ZEALAND.

CULTIVATOR.

SPECIFICATION forming part of Letters Patent No. 555,623, dated March 3, 1896.

Application filed October 3, 1895. Serial No. 564,548. (No model.)

*To all whom it may concern:*

Be it known that we, GEORGE WILLIAM SHAILER, settler, and JOHN SAMUEL WATCHORN, merchant, subjects of the Queen of Great Britain, residing at Palmerston North, in the Colony of New Zealand, have invented an Improved Cultivator, of which the following is a specification.

Our invention consists of the special features hereinafter described and particularly pointed out in the claim.

Our invention is illustrated on the accompanying sheets of drawings, in which—

Figure 1 is a front view of our machine as arranged to be worked by hand for flower borders, market-gardens, and orchards. Fig. 2 is a side view of the same. Fig. 3 is a side view of one of the disks or cutters. Fig. 4 is a section of the same, taken through the line A B; and Fig. $4^a$ is a section of one of the tines, taken through the line C D. Figs. 5 and 6 are views of our invention adapted to animal-power.

Referring to Figs. 1, 2, and 3, $a$ are side frames having handles $a'$ and wheels $b$, which enable the machine to be easily moved over the surface of the soil.

$c$ are brackets fastened to the frames $a$ in any suitable manner and carrying a spindle $c'$, on which revolve disks $d$. These disks $d$ form the principal part of our invention and consist of a central boss $d'$, upon which are formed, mounted, or cast excavating tines or teeth $d^2$. We prefer these to be about five-eighths of an inch broad throughout their whole length on the front edge and tapering off to the back, as shown in full-sized section in Fig. $4^a$. On the periphery of the boss and between the tines we form by preference a projecting cutting-edge $e$, which serves to strengthen the said tines and also to cut into the top soil and render it more capable of separation by the tines. By this arrangement any sticks, straws, or refuse on the surface are broken up.

We find it best in practice to make the tines or teeth $d^2$ about equal in length to the diameter of their boss $d'$ and of a total diameter, say, of twelve inches, the boss being four inches in diameter. They are curved, as shown in Fig. 3, of the proper curve for entering the ground, the bosses $d'$ forming a roller which rolls upon the ground as the machine progresses forward. The disks work freely upon the axle $c$ and, being set at about one inch and a quarter apart, cut into the soil, thoroughly disintegrating it and throwing the refuse and weeds behind as the machine progresses. It will be found that the weight of the machine itself in general gives sufficient adhesion to enable the tines to work without slipping, but, if necessary, additional weight may be added in any well-known manner.

$f$ in Figs. 1 and 2 shows curved plates fastened at one end to the frame $a$ and passing down between the tines to act as scrapers and prevent choking between the said tines when working on some descriptions of soil. These curved plates can also be adapted to the machine illustrated in Figs. 5 and 6.

In Figs. 5 and 6 is shown our machine as adapted to animal-power, in which case similar disks $d$ are made use of, revolving on a spindle $c'$, carried by radial arms having a quadrant rack $r$ and spiral $s$, worked by a handle $s'$ and actuated by the driver sitting in the seat $t$, by which means the pressure upon the disks and the effect of the tines can be regulated according to the nature of the soil and the purposes for which the machine is required.

It will be evident that the size, number, and form of the disks and tines may be varied according to the work to be done.

What we claim as our invention, and desire to secure by Letters Patent, is—

In combination in a cultivator, the frame and the cultivator-disks having projecting tines or teeth with the cutting-edge $e$ around the periphery of the disk and between said tines, substantially as described.

G. W. SHAILER.
JOHN SAMUEL WATCHORN.

Witnesses:
W. E. HUGHES,
WALTER ALEXANDER.